Nov. 18, 1969　　　J. ISREELI ET AL　　　3,479,142
VOLUME-ADJUSTABLE CONDUIT FOR LIQUID ANALYSIS APPARATUS
Filed Oct. 13, 1966　　　　　　　　　　　　　8 Sheets-Sheet 1

INVENTORS
Jack Isreeli and
Leonard T. Skeggs
BY
Henry Cohen
ATTORNEY

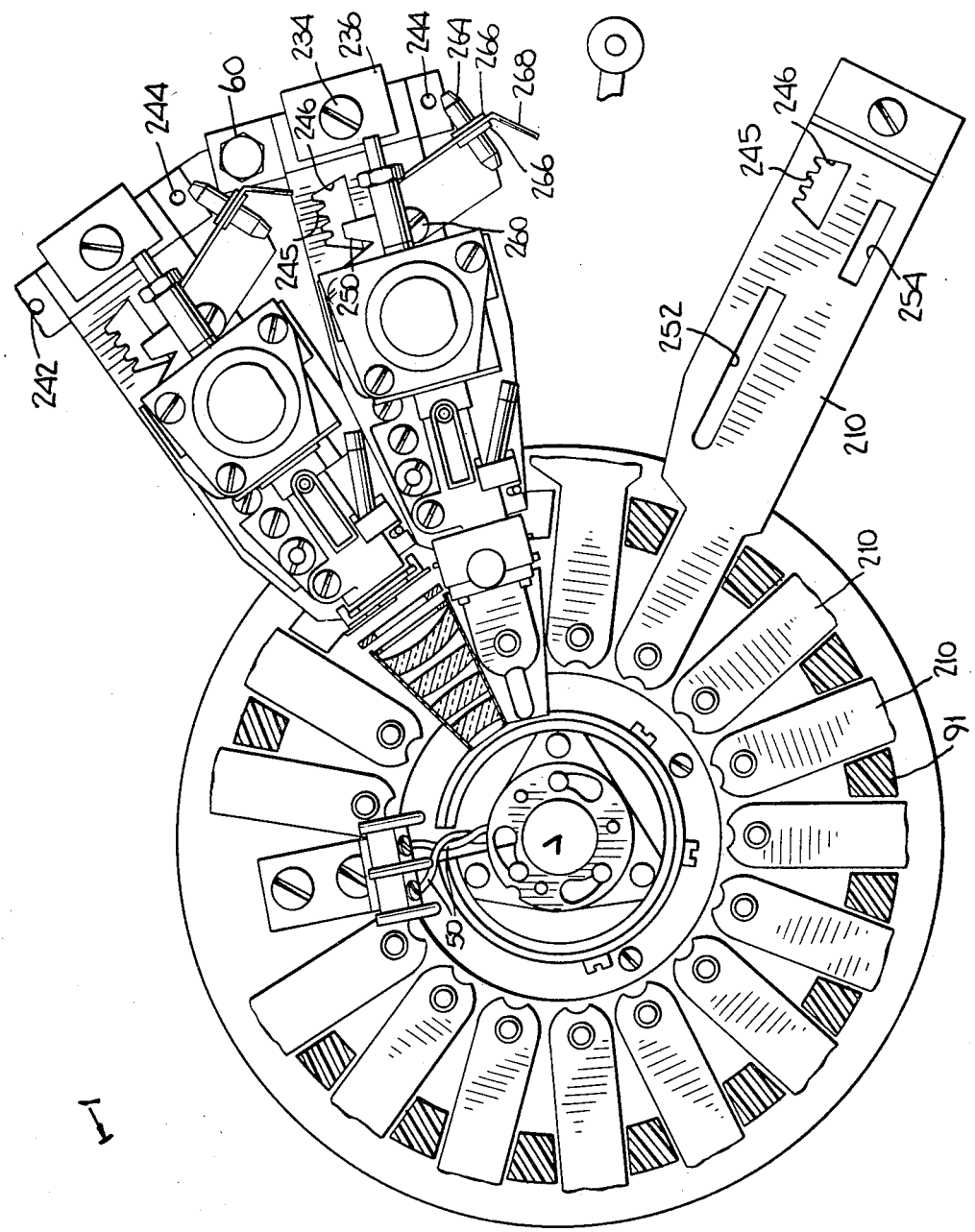

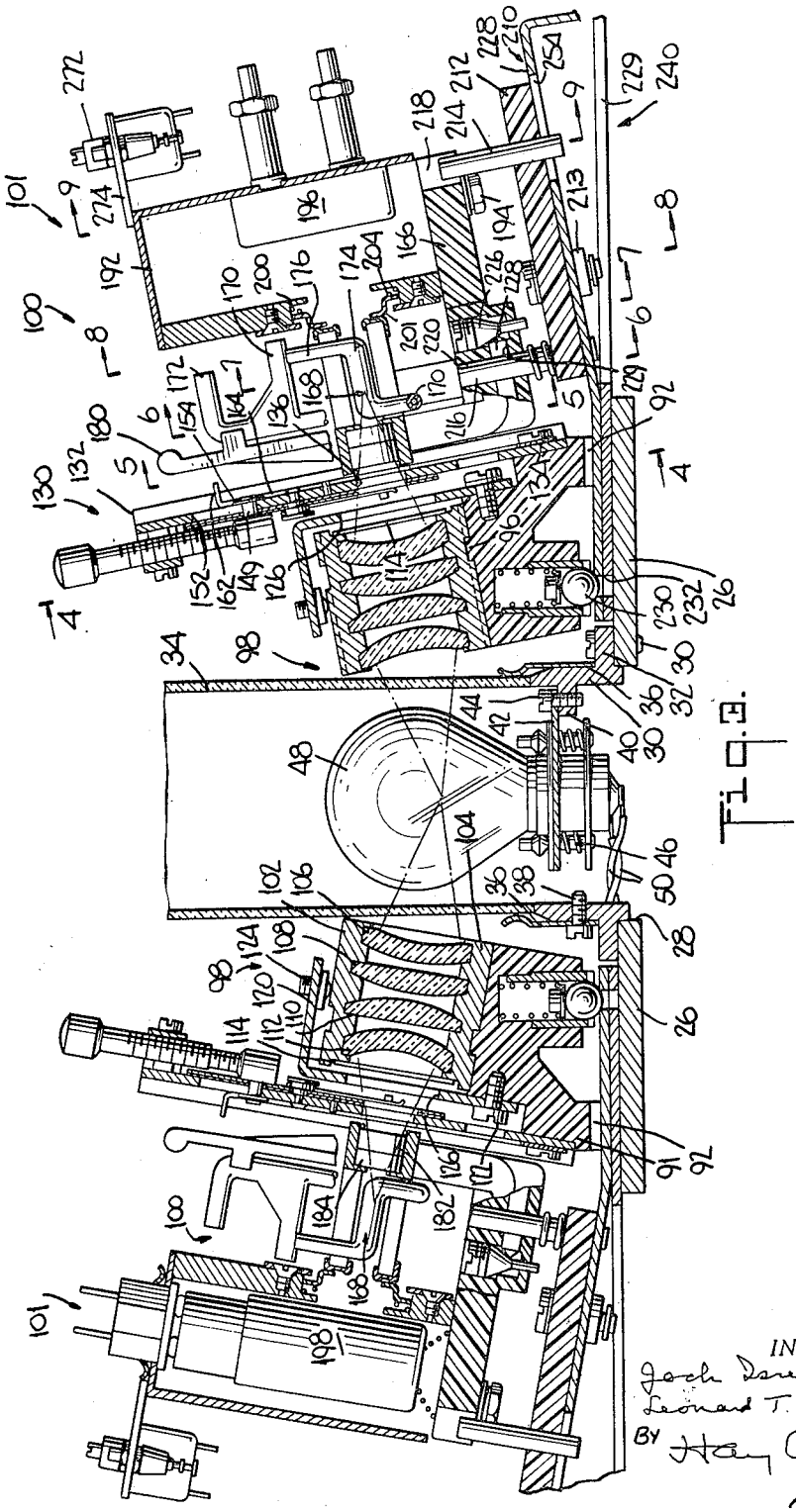

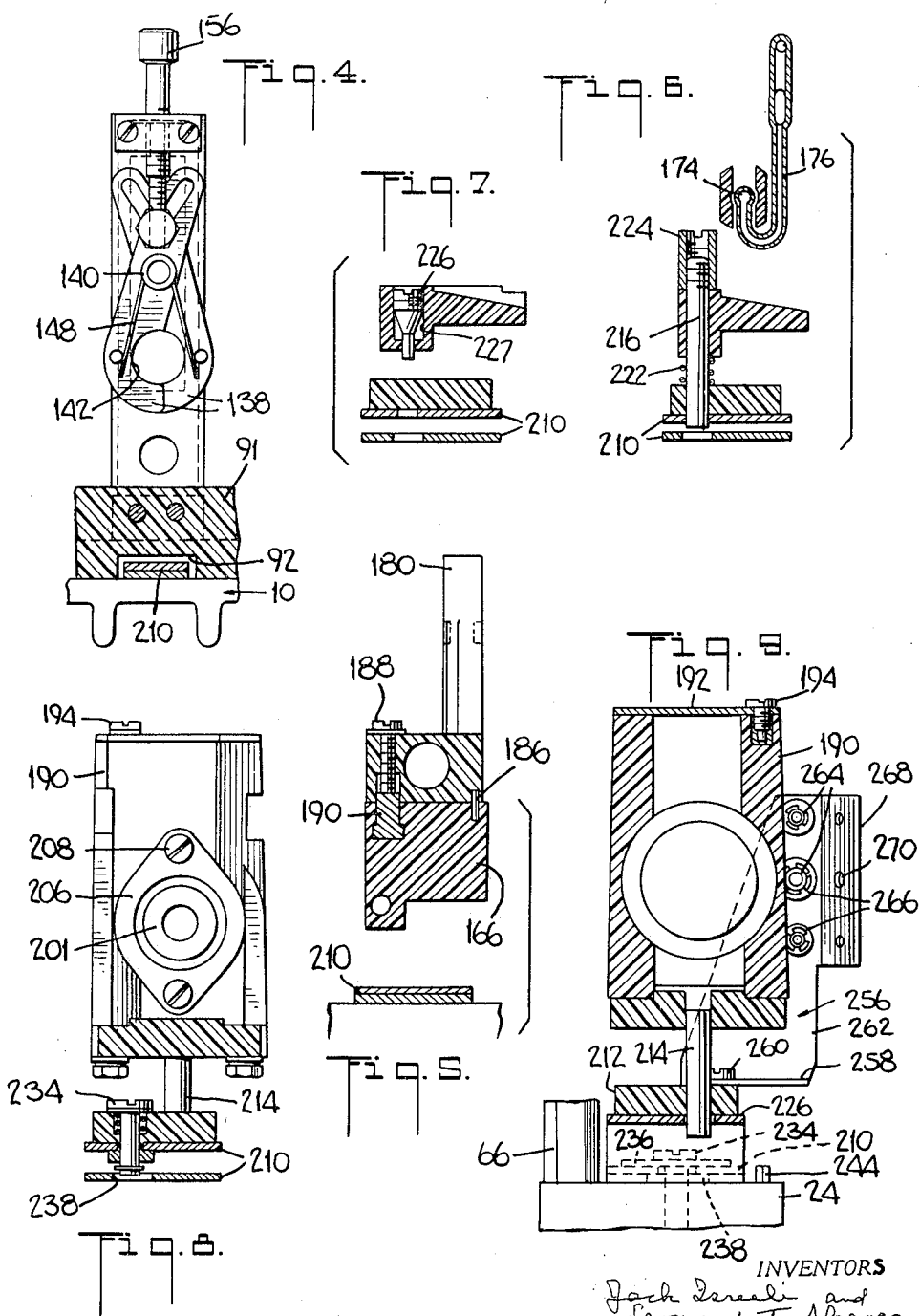

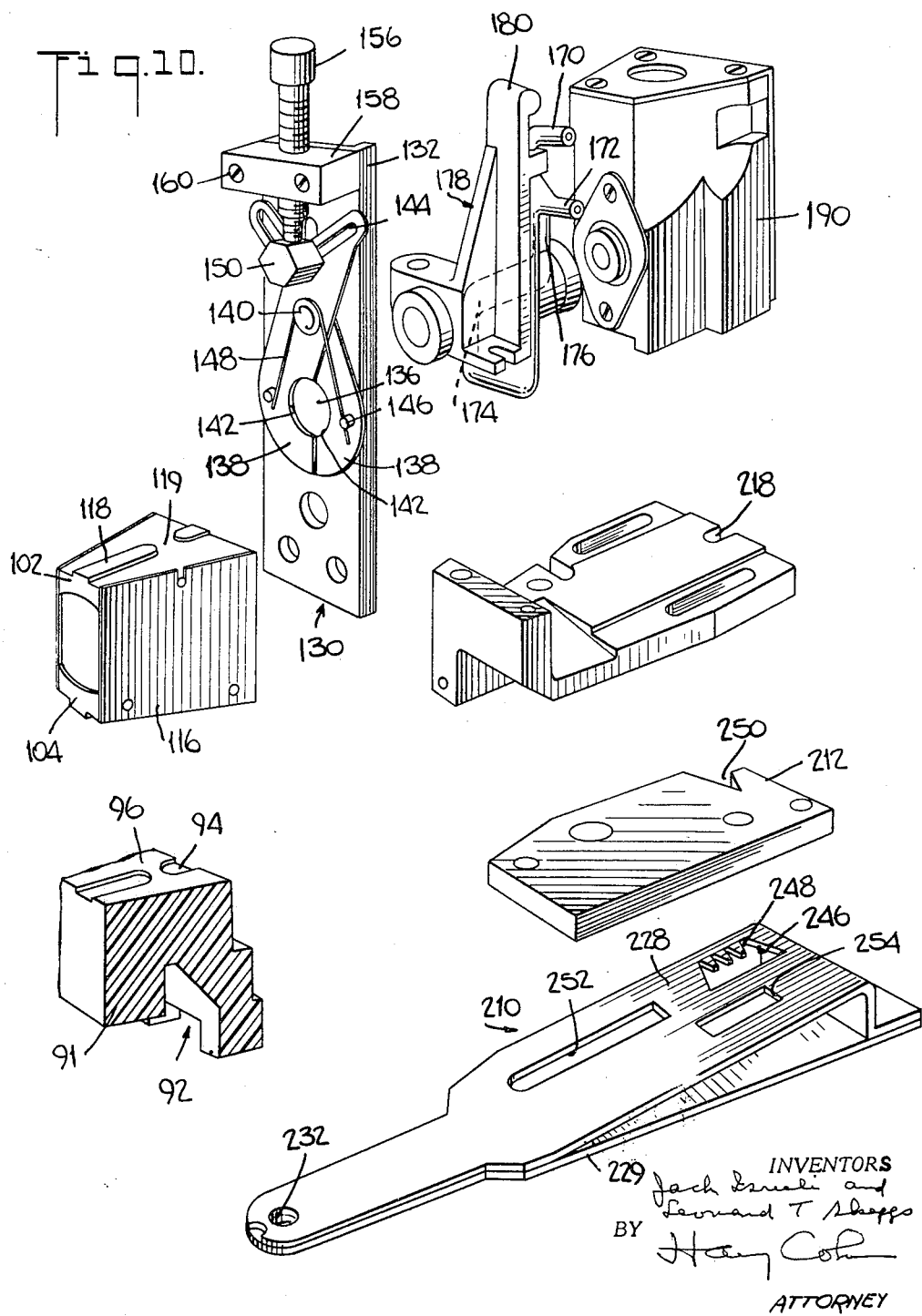

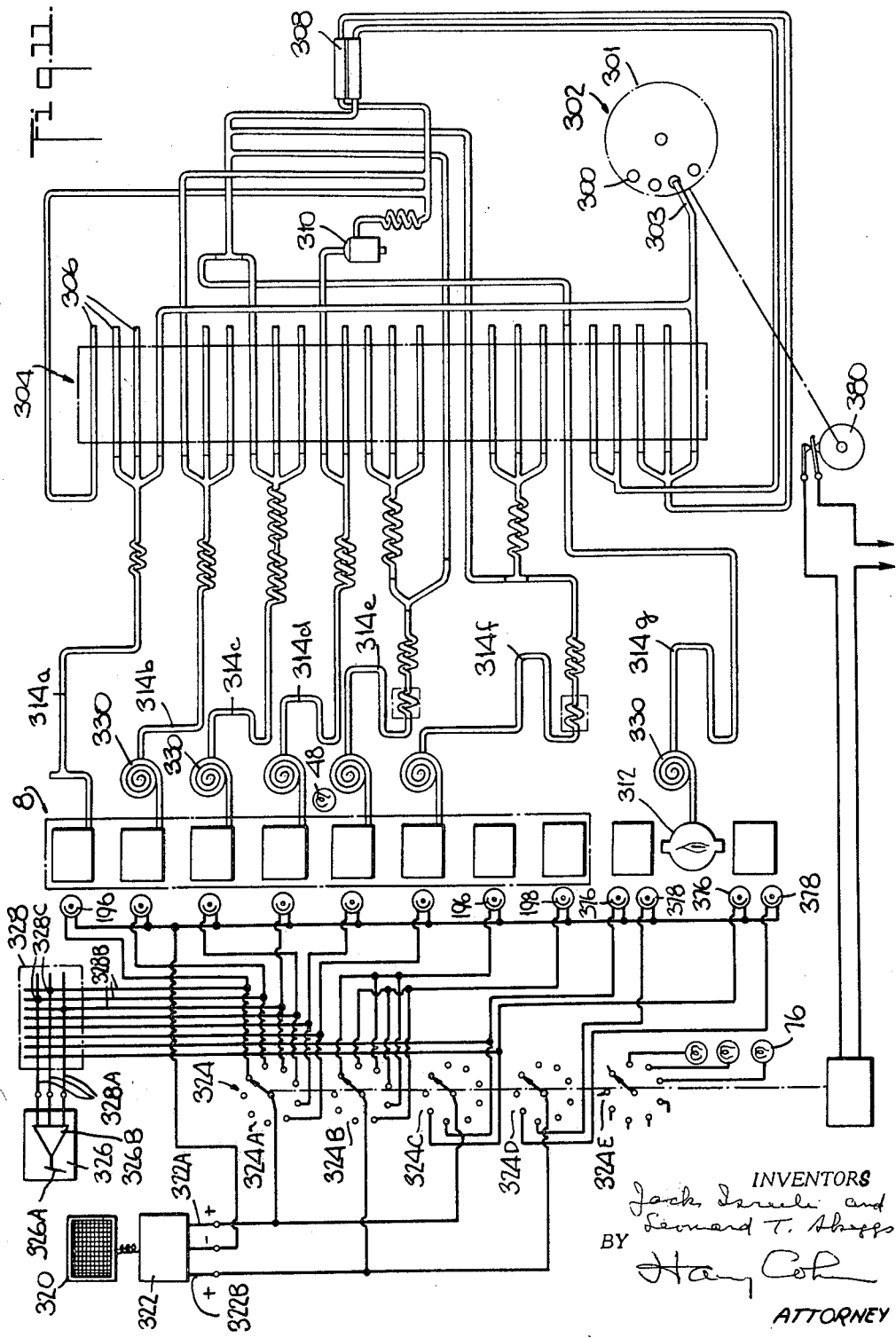

Nov. 18, 1969   J. ISREELI ET AL   3,479,142
VOLUME-ADJUSTABLE CONDUIT FOR LIQUID ANALYSIS APPARATUS
Filed Oct. 13, 1966   8 Sheets-Sheet 7
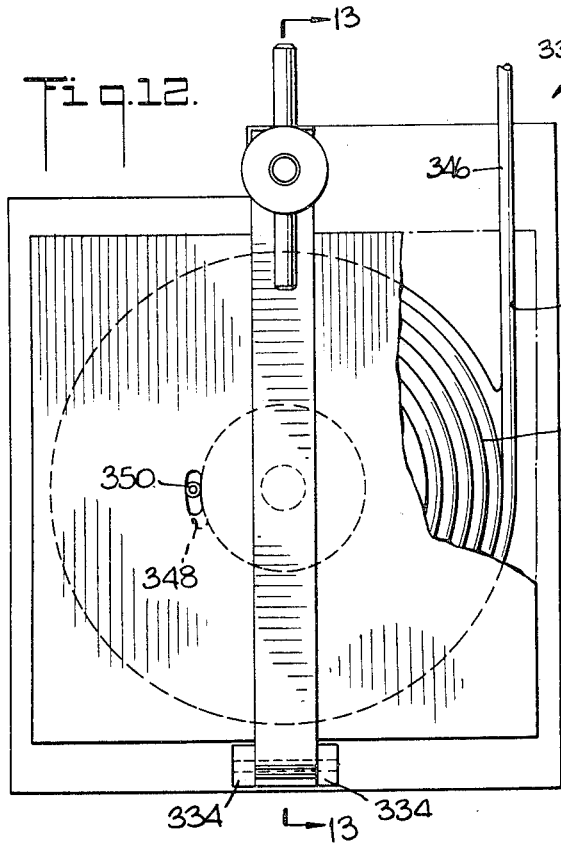
Fig.12.
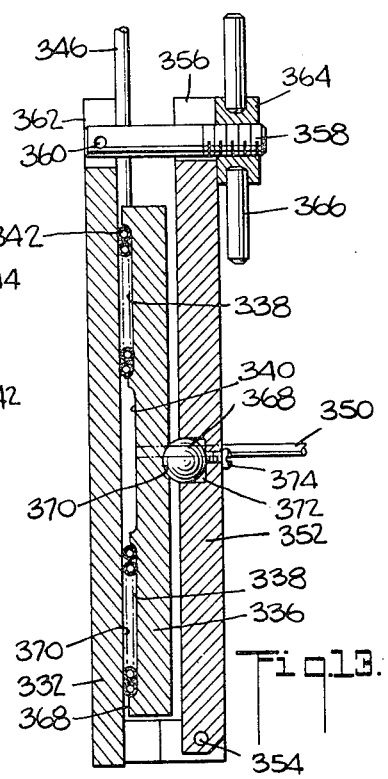
Fig.13.
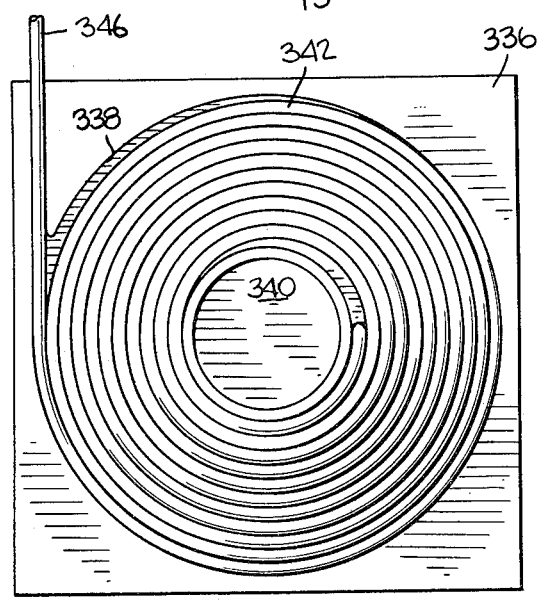
Fig.14.
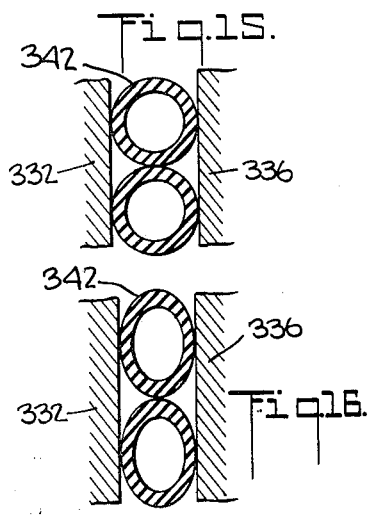
Fig.15.
Fig.16.
INVENTORS
Jack Isreeli and
Leonard T. Skeggs
BY
Harry Cohen
ATTORNEY Nov. 18, 1969     J. ISREELI ET AL     3,479,142
VOLUME-ADJUSTABLE CONDUIT FOR LIQUID ANALYSIS APPARATUS
Filed Oct. 13, 1966     8 Sheets-Sheet 8
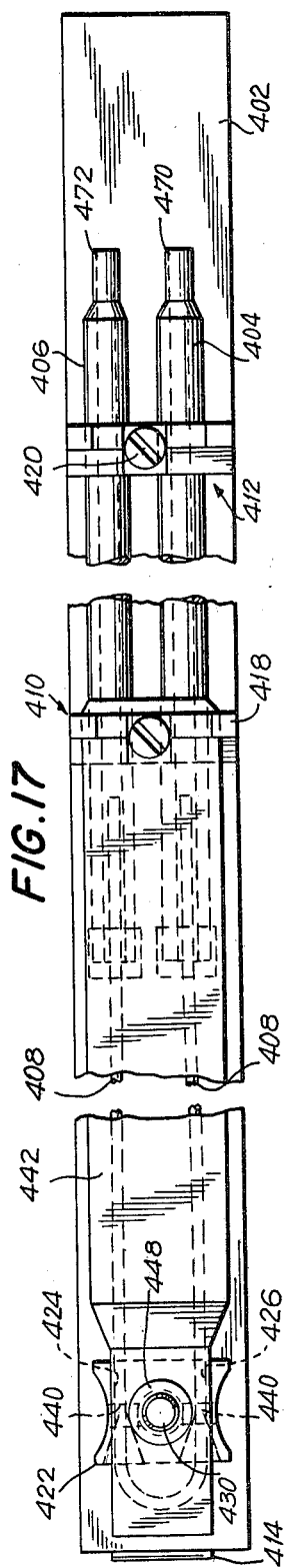
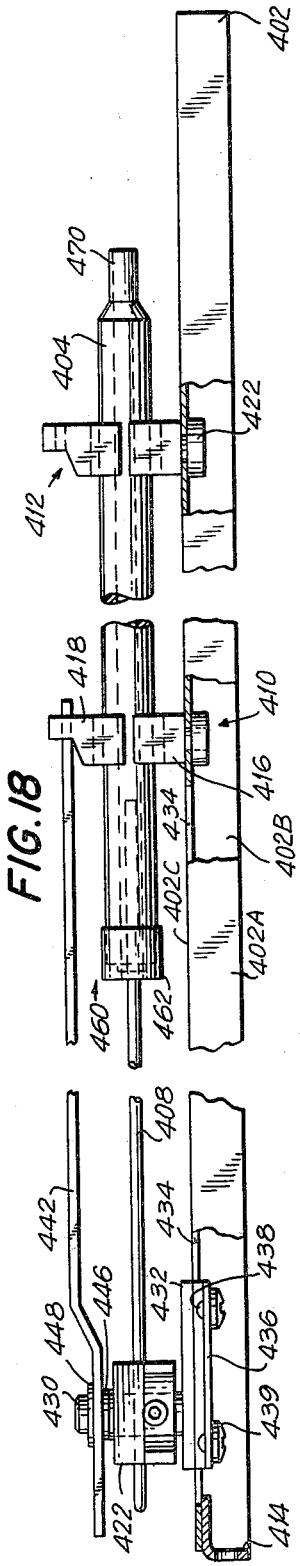
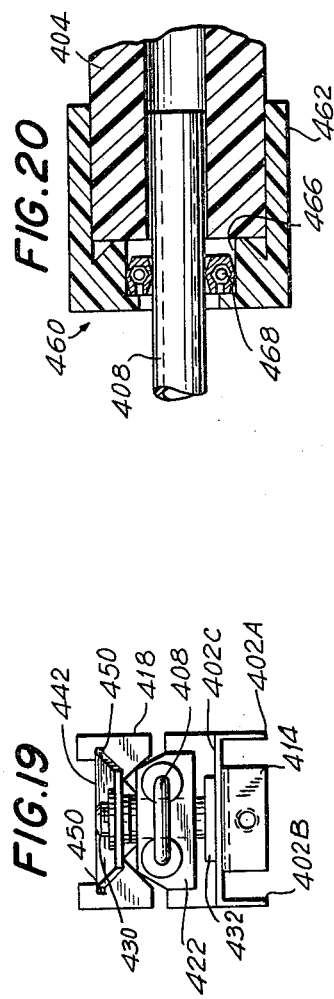
INVENTORS
JACK ISREELI
LEONARD T. SKEGGS
BY
ATTORNEY United States Patent Office 3,479,142
Patented Nov. 18, 1969

3,479,142
VOLUME-ADJUSTABLE CONDUIT FOR LIQUID ANALYSIS APPARATUS
Jack Isreeli, Mamaroneck, N.Y., and Leonard T. Skeggs, Kirtland, Ohio, assignors to Technicon Corporation, a corporation of New York
Continuation-in-part of application Ser. No. 529,366, Feb. 23, 1966. This application Oct. 13, 1966, Ser. No. 586,410
Int. Cl. G01n *31/00*
U.S. Cl. 23—253   7 Claims

ABSTRACT OF THE DISCLOSURE

Apparatus for effecting a plurality of analytical tests on successive liquid samples. Each liquid sample is broken up into fractional portions, or quotients, each of which is treated with an appropriate reagent at a treatment stage to provide a color reaction indicative of the concentration of a particular constituent under test. Each treatment stage is connected along a conduit means to a corresponding flow cell in a colorimeter. To insure that portions of each fraction portion have a maximum optical density during read-out, the conduit means are provided with telescoping sections for continuously varying the volume of the conduit means to phase the arrival time of each fractional portion at its corresponding flow cell.

---

This application is a continuation-in-part of U.S. patent application Ser. No. 529,366, filed Feb. 23, 1966.

This invention relates to the analysis of fluids with respect to one or more substances present in the fluids, and especially to an improved colorimeter for quantitatively analyzing a plurality of fluid samples at substantially the same time.

In the article "Multiple Automatic Sequential Analysis" by Leonard T. Skeggs, Jr. et al. in Clinical Chemistry, vol. 10. No. 10, October 1964, pp. 918–936, there is discussed an apparatus which is adapted to quantitatively analyze each of a plurality of fluid samples for a plurality, such as eight, different substances or constituents therein. Briefly, each of the sample fluid, which may be a body fluid such as blood or urine, is disposed in a respective container. The containers are mounted on a movable support which automatically, sequentially, and intermittently presents each of the containers to an off-take station. An off-take tube is automatically inserted into the presented container and the sample is aspirated therefrom as a stream of fluid. The sequentially aspirated samples are formed into a continuous stream wherein each sample is spaced from the preceding sample by a segment of air. This initial stream of samples is divided into a plurality of quotient streams of samples, each quotient sample being a fractional portion of a respective sample in the initial stream. Each of the quotient streams is treated with a reagent, as taught in the U.S. Patent No. 2,797,149 to Leonard T. Skeggs, issued June 25, 1957, to provide a color reaction which is responsive to the concentration of a predetermined substance in each respective fractional sample portion. Each of the quotient streams is passed through a respective colorimeter and the light transmittance at a predetermined wavelength of each fractional sample portion is determined and the equivalent concentration is recorded. In the embodiment shown therein, the respective colorimeters comprise a plurality of respective flow cells and a single light source and light focusing means, which are sequentially and cyclically shifted from flow cell to flow cell. The arrival times of the fractional sample portions from the same sample from the initial stream are sequentially phased so that each of these portions may be examined sequentially in a group.

It is desirable that the fractional portions of the same sample from the initial stream of samples not only arrive at their respective flow cells when such flow cells are to be read out to the recorder, but also that the subportion of each such portion which is in the flow cell when such flow cell is being read-out be at its maximum optical density, since it is the maximum optical density of a treated sample which is responsive to the constituent of interest therein. To achieve this result, the running time of each of the quotient streams, from the time it leaves the off-take tube to the time it reaches its flow cell, must be accurately adjusted in phase with the other quotient streams and the means for reading out the signal to the recorder.

It is, therefore, an object of this invention to provide a means for infinitely varying the running time of a stream of liquid.

A feature of this invention is the provision of means for adjustably varying the phasing of the arrivals of the various quotient samples at their respective flow cells comprising a conduit means having an adjustably variable volume for each quotient stream which is to be adjusted.

These and other objects, features and advantages will become apparent upon consideration of the following specification taken in conjunction with the accompanying drawing, in which:

FIG. 2 is a view in plan, partially disassembled, taken along the plane 2—2 of FIG. 1;

FIG. 3 is a view in elevation, partially in cross-section, of a detail of FIG. 1;

Figure 1:
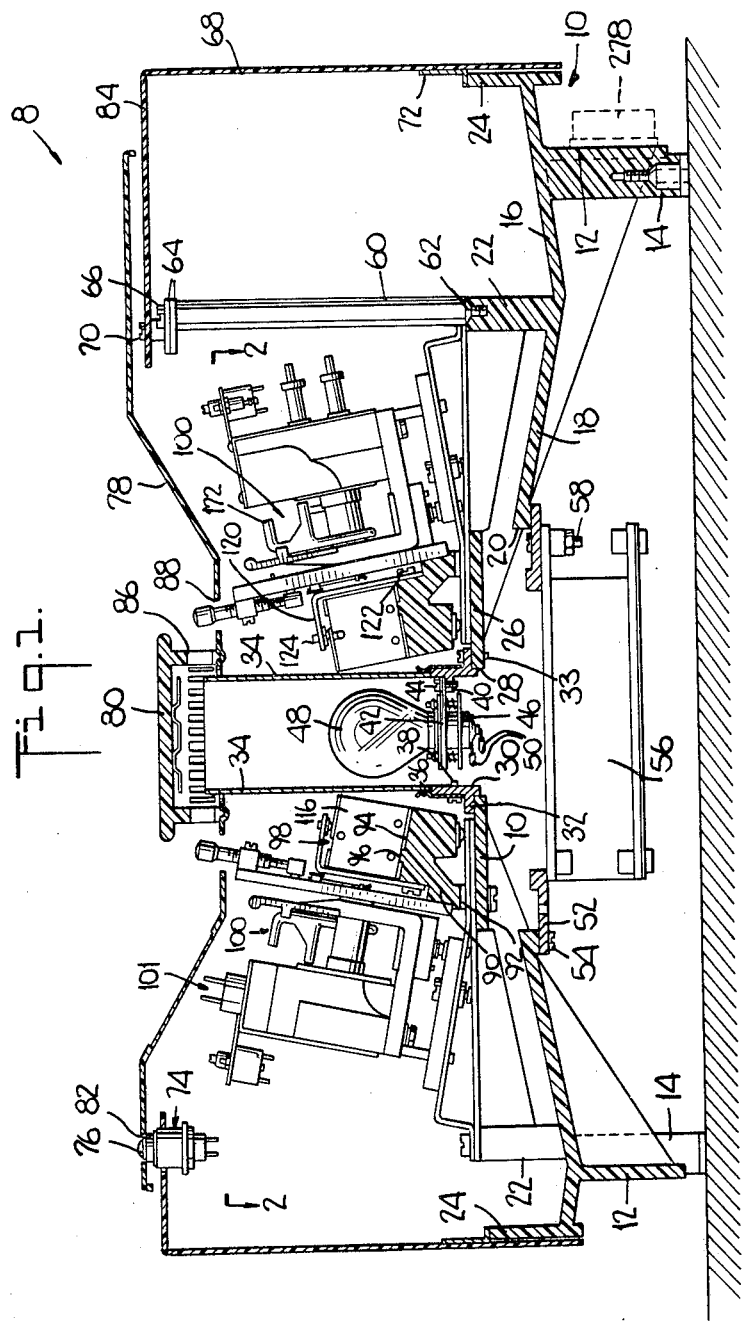
FIG. 1 is a view in elevation of a colorimeter embodying this invention, taken along the plane 1—1 of FIG. 2.

FIGS. 4, 5, 6, 7, 8 and 9 are views in elevation, in cross-section, taken along respective planes 4—4, 5—5, 6—6, 7—7, 8—8 and 9—9 of FIG. 3;

FIG. 10 is an exploded perspective view of a flow cell and optics assembly of FIG. 3;

FIG. 11 is a pictorial view of a system embodying the colorimeter of FIG. 1;

FIG. 12 is a view in elevation of a first embodiment of a quotient stream phasing means;

FIG. 13 is a view in elevation, in cross-section taken along the plane 13—13 of FIG. 12;

FIG. 14 is a view in elevation of a part of the phasing means of FIG. 12;

FIGS. 15 and 16 are detail views, in cross-section, of the phasing means of FIG. 12;

FIG. 17 is a top view in plan of a second embodiment of a quotient stream phasing means;

FIG. 18 is a side view in elevation of the phasing means of FIG. 17;

FIG. 19 is an end view in elevation of the phasing means of FIG. 17; and

FIG. 20 is a detail view, in cross-section, of the phasing means of FIG. 18.

A colorimeter 8 embodying this invention is shown in FIGS. 1, 2 and 3 as including a base member 10 having a lower annular, vertically elongated portion 12; which is supported by a plurality of foot portions 14 above a ground level; an inwardly downwardly sloped, annular, laterally elongated portion 16; a lower, outwardly downwardly sloped, annular, laterally elongated portion 18, having a central aperture 20; an inner annular, vertically elongated castellated portion 22; an outer, annular vertically elongated portion 24, and an upper, horizontal, laterally elongated portion 26, having a central aperture 28. An upper, tubular housing 30 having an external, annular flange 32 is fixed coaxially over and into the upper, central aperture 28 by a plurality of machine screws 33. A tube 34 of light permeable material, such as a heat resistant glass, is disposed coaxially over the housing 30, and is held in place by a plurality of spring fingers 36 fixed to the housing 30 by a respective plurality of machine screws 38. The housing 30 also has an internal, segmented, annular flange 40. A triangular shaped bracket 42 is fixed to the segmented flange 40 by a plurality of machine screws 44. A lamp base assembly 46 is mounted to the bracket by a spring loaded bayonet arrangement and supports a lamp 48. A pair of electrical conductors 50 are soldered to the contacts of the lamp and lead to a regulated source of voltage, not shown. A lower, tubular housing 52 is fixed to the base member coaxially below the lower central aperture 20 by a plurality of machine screws 54. A fan and motor assembly 56 is fixed coaxially below and to the housing 52 by a plurality of bolts 58. This assembly serves to pass air in under the base member portion 12 and up through the tube 34 past the lamp 48.

A plurality of upstanding posts 60 are threaded at their lower ends 62 and are thereby fixed to the base member portion 22. A plurality of annular plates 64 are fixed to the upper ends of the posts 60 by a plurality of machine screws 66. A sidecover 68 is fitted over the base member 10 and is fixed thereto by a plurality of machine screws 70 threaded into the plates 64 and an annular bracket 72 abutting the base member portion 24. A plurality of indicator lamp base assmblies 74 are fixed to apertures in the annular plates 64 and have respective lamps 76 disposed therein. A top-cover 78, having a central chimney portion 80 is disposed on top of the side-cover 68. The top-cover 78 has a plurality of apertures 82 therein which respectively pass a lamp 76 therethrough, so that the top-cover is supported on the lamp base assemblies and spaced above the top portion 84 of said side-cover. The chimney portion is disposed coaxially above the tube 34 and has a plurality of side apertures 86. The top-cover also has a plurality of apertures 88 to pass adjusting screws as will be hereinafter described.

An annular body member 90 is disposed above and concentric with the base member upper portion 26, and is fixed thereto by machine screws, not shown. This body member is divided into a plurality of pie shaped segments 91, e.g., sixteen, each having an arc of 21°. Each body segment 91 has a lower groove 92, and an upper groove 94 which is interrupted by a projection 96 in an upper surface which is at an angle of 10° to the horizontal. A plurality of lens assemblies 98, flow cell assemblies 100 and light detector assemblies 101 are each respectively disposed at each body segment.

Each lens assembly 98 comprises an upper lens block 102 and a lower lens block 104 which support four lenses 106, 108, 110, 112 on a common axis which is at an angle of 10° to the horizontal. The lens blocks are cemented together, a glass cover 114 is cemented over the rear aperture, and side plates 116 are cemented to the sides. The lower lens block (and the upper lens block) has a projection 118 which is interrupted at 119 and which is adapted to interfit with the upper groove 94 of the body segment 91. The lens assembly may be slid along the common axis, within the limits provided by the interruptions of the projection and the groove to vary the focal point of the beam of light from the lamp 48 which is focused by the lens assembly. An L-shaped clamp bracket 120 is fixed to the body segment 91 by a machine screw 122, has a clamping screw 124 which bears against the top of the lens assembly, and has a central aperture 126 to pass the light beam through to the flow cell assembly.

A beam control assembly 130 includes a channel 132 which is fixed to the body segment 91 by two machine screws 134 and has a central aperture 136 to pass the light beam through to the flow cell assembly. Two shutter blades 138 are pivotally mounted on a stud 140 to the channel 132. Each blade 138 has a semi-circular cut-out 142, a slot 144 and a pin 146. A hair pin spring 148 is mounted on the stud 140 and extends between the two pins 146 to bias the cut-outs 142 apart. A stud 149, having a head 150, passes through a slot 152 in the channel 132 and both of the slots 144 of the two blades 138, and is secured with a C clip 154. An adjustment screw 156 is threaded through a nut 158, which nut is fixed to the channel 132 by two machine screws 160, and is captured in the head 150 to oppose the bias of the spring 148. A slide 162 has a central slot 164 which pases the stud 149 and the C-clip 154. When the slide is pushed down, as shown in FIG. 3, the slot 164 passes the light beam to the flow cell assembly; when the slide is up, the lower portion of the slide obturates the light beam. Operation of the adjustment screw 156 enlarges or diminishes the aperture provided by the blades and controls the intensity of the light beam passed to the slot 164.

The flow cell assemblies 100 and the light detector assemblies 101 are each mounted in companion sets on a cradle 166. The flow cell 168 comprises an integral glass tube having a fluid inlet 170, a debubbler outlet 172, a sight passageway 174 and a waste outlet 176. The flow cell 168 is cemented into a flow cell holder 178 having a handle 180 and one or two interference filters 182 and 184. The filters and the sight passageway have a common longitudinal axis. The holder 178 is secured to the cradle 166 by a locating pin 186, and by a bolt 188 which threads into an insert 190 in the cradle.

The light detector assembly 101 includes a housing 190 which has a cover 192 and is fixed to the cradle by two machine screws 194. Each assembly has as a detector either a photocell 196 or a vacuum tube detector 198 mounted therein. The front of the housing has an aperture 200 therein in which are disposed an apertured baffle 201 and a biasing spring 204, which are retained by an apertured plate 206 to the housing by two machine screws 208. The spring 204 biases the apertured baffle 201 against the rear of the flow cell holder 178 to provide a light-tight path from the sight passageway to the light detector.

The cradle 166 is supported on a bracket 210 which is fixed to a block 212 by a bolt and nut 213. A rod 214 and a rod 216 are fixed at their lower ends in the block 212. The upper end of the rod 214 slidably fits in a slot 218 in the cradle. The upper end of the rod 216 is threaded and slidably fits through a bore 220 in the cradle. A helical spring 222 is disposed over the rod 216 between the block and the cradle and biases them apart. A nut 224 is threaded onto the projecting upper end of the rod 216 and bears against the upper surface of the cradle. The nut 224 adjusts the vertical position of the cradle against the bias of the spring 222. A screw 226 having a cone shaped end is threaded into a bore 227 in the cradle and bears against a rod 228 which is disposed in a bore 229 communicating with the bores 220 and 227. Advancement of the screw 226 clamps the rod 228 against the rod 216. The bracket 210 has an upper surface 228 which is at an angle of 10° to a lower surface 227. The lower surface 227 of the bracket is adapted to be releasably mounted on the horizontal base member portion 26 with the forward end of the bracket passing through the lower groove 92 of the body segment 91. The body segment 91 has a spring loaded, captured ball detent 230, the ball of which is adapted to engage a hole 232 in the forward end of the bracket. The rearward end of the bracket is adapted to be releasably mounted on the base member portion 22 by means of a bolt 234 whose head bears on a clamping plate 236, and whose shank passes through a hole in the clamping plate, through an enlarged hole 238 in the bracket 210, and into a threaded hole in the base member portion 22.

The assemblage 240 of the flow cell assembly 100, the light detector assembly 101, the block 212 and the bracket 210 may be adjusted horizontally-laterally with respect to the common axis of the lens assembly 98 by means of two pins 242 and 244, or the post 60 and one pin 244, respectively, upstanding from the base member portion 22 on each side of the rearward end of the bracket 210. The bolt 234 may be loosened slightly, and a screwdriver may be inserted between a pin (or post) and the bracket and twisted to shift the bracket about the ball detent 230.

The assemblage of the flow cell assembly 100, the light detector assembly 101 and the block 212 may be adjusted longitudinally with respect to the common axis of the lens assembly by means of a cut-out 246 having a plurality of serrations 245 in the bracket 210 and a notch 250 in the block 212. The bolt and nut 213 may be loosened slightly, and a screwdriver may be inserted between successive serrations and the notch, and twisted to shift the block with respect to the bracket. The rods 216 and 214 project through the block 212 into slots 252 and 254 in the bracket and serve to preclude relative lateral movement therebetween.

To permit the convenient interconnection of liquid passing conduits to the flow cell 168 a bracket 256 has a horizontal leg 258 pivotally mounted to the rearward end of the block 212 by a machine screw 260. A vertical leg 262 upstands from the leg 258 and has three holes therein into which three conduit junctions 264 may be respectively mounted by snap rings 266. Another vertical leg 268 extends laterally at an angle from the leg 262 and has three holes 270 into which the junctions 264 may be alternatively mounted. Three short lengths of flexible conduit, not shown, may be respectively connected between the three terminations 170, 172 and 176 of the flow cell and the forward terminations of the junctions. The rearward terminations may be coupled by flexible conduits to the treatment manifolds as will be hereinafter described. Depending on which direction, clockwise or counter-clockwise, these latter conduits are to be brought out, the junctions may be mounted in either leg 268 or 262, respectively. A potentiometer 272 may be mounted through a bracket 274 which is fixed to the top of the detector housing by machine screws 194. The various electrical connections to the colorimeter may be brought in through a multicontact plug 278 secured through the base member portion 12. The various liquid connections to the colorimeter may be brought in by conduits through a suitable aperture in the base member, not shown.

To provide the recorder of the analyzer system with standard or reference signals, two of the flow cell assemblies are modified, one associated with a photocell detector, the other associated with a vacuum tube detector. In each case the flow cell 168 is formed as a solid glass body, providing a low light transmittance, but precluding the presence of vapor bubbles. Alternatively, the flow cell may be cut down to include the sight passageway and a portion of bent tubing at each end thereof. A reference fluid is disposed in this cell and the two ends are sealed. No liquid conduits are provided to these two flow cell assemblies.

It will be appreciated that should any leakage occur in the fluid system, any leaked liquid will be drained down to the sloped portions 18 and 16 of the base member 10, whereat the collected liquid may be conveniently drained off from an aperture, not shown, at the apex of these portions.

An examplary system which provides the samples sequentially to form the initial stream of sequentially flowing samples, which divides the initial stream into a plurality of quotient streams and treats the streams for analysis, which analyzes each of the quotient streams for at least one respective constituent, and which records the results of such analysis, is shown in FIG. 11. Such a system is described in detail in the Skeggs et al. article, supra. Briefly, the samples are respectively disposed in containers 300, which are mounted on the indexible turntable 301 of a sampler assembly 302 which includes an off-take tube 303 which is inserted into each container as it is presented thereto. A peristaltic type proportioning pump 304 has a plurality of pump tubes 306, which tubes are concurrently engaged by a plurality of rollers and progressively occluded along their lengths thereby. The pump tubes form part of a manifold which is effective to draw the samples through the off-take tube 303 as an initial flowing stream of sequential samples, to divide the initial stream into a plurality of quotient streams and to treat the streams for analysis, as by dialysis at 308, by gas separation at 310, by the addition of suitable reagents, to provide a color reaction which is responsive to the concentration of the constituent of interest in each quotient sample. The quotient streams are passed either to the colorimeter 8 or to a flame spectrometer 312. For example, in the colorimeter, the quotient stream in the conduit 314a may be analyzed for albumin by the addition of a H.A.B.A. reagent; the quotient stream in the conduit 314b may be analyzed for total protein by a biuret reagent; the quotient stream in the conduit 314c may be analyzed for chlorides by a chloride reagent; the quotient stream in the conduit 314d may be analyzed for carbon dioxide by the addition of a $CO_2$ reagent after a gas separation at 310; the quotient stream in the conduit 314e may be analyzed for glucose by an orcinol solution; and the quotient stream in the conduit 314f may be analyzed for urea nitrogen by the addition of diacetyl monoxime and ferric alum reagents. The quotient stream in the conduit 314g may have lithium sulfate added as a standard and may be analyzed for sodium and potassium in the spectrophotometer 312.

A primary chart recorder 321, driven by a null-balancing bridge 322, is utilized to cyclically record the peak value from the analysis of each quotient sample, so that the analyses of each of the quotient samples from the identical initial sample are recorded as a sequential group. To accomplish this, the running time of each of the quotient streams is respectively delayed or phased so that their peaks arrive sequentially at their respective flow cells or the spectrophotometer. A sampling switch 324 is also provided to couple the signal from the respective detector 196 associated with the respective flow cell 168 to the bridge 322. To monitor the peaking of each sample there is also provided a monitoring recorder 326 which may be coupled by a switch 328 to the detectors of one or a plurality of flow cells for a full cycle of quotient samples. Thus, the monitoring recorder will trace the complete signal provided by a quotient sample from minimum through peak to minimum, while the primary recorder only records a segment of the complete signal, which segment should include the peak.

To permit the shifting of the arrival time of each peak so that it will be passed by the sampling switch 324 to the recorder, all but one of the conduits leading to the flow cells or the spectrophotometer are each provided with means for adjustably varying the length of time it takes for the quotient stream to flow through such conduit. Such a means is found in the variable volume conduit 330 shown in FIGS. 12 through 16, and in the variable volume conduit 400 shown in FIGS. 17 through 20, each of which shall be called hereinafter a phaser.

The phaser 330 comprises a flat, fixed base plate 332 having two upstanding elements 334 to serve as a hinge bracket. A movable plate 336 is disposed above the base plate 332 and has an outer annular recess 338 and an inner annular recess 340 formed therein confronting said base plate. A resiliently flexible tube 342 is formed into a flat helix and disposed in the outer annular recess 338. The turns may be joined together by a solvent or adhesive to form an integral unit. The recess 338 is provided with a tangential groove 344 to accommodate a continuation 346 of the outermost turn of the helix, and with a transverse bore 348 to accommodate a continuation 350 of the innermost turn of the helix. A bar 352 has one end thereof pivotally mounted between the brackets 334 by a pivot pin 354; and the other thereof has a slot 356 to receive one end of a threaded rod 358. The other end of the threaded rod 358 is mounted by a pivot pin 360 in a slot 362 to the base plate 332. A nut 364 having handle projections 366 is adapted to be advanced on the rod 358 to bear against the bar 352. A ball bearing 368 is disposed in part in a spherical 370 in the plate 336 and in part in a cylindrical cavity 372 in the plate 352. A machine screw 374 is disposed through the plate 352 into the cavity 372 to adjust the extent of the projection of the ball bearing from the cavity 364. It will be seen that advancement of the nut 364 on the rod 358 against the bar 352 will press the ball bearing 368 against the plate 336, compressing the resiliently flexible tube 342 between the plate 332 and the plate 336, until the confronting faces 368 and 370 of the plates 336 and 332, respectively, abut. Such compression changes the normally circular cross-section area of the resilient tube 342 shown in FIG. 15 into a relatively elliptical cross-section area shown in FIG. 16. It will be appreciated that the length of the tube 342 remains unchanged, and that the internal volume contained by the tube is reduced by the compression from the maximum afforded by the circular cross-section. As the contained volume of the tube is reduced, the residence time required for a given volume of fluid driven at a given volumetric rate of flow to pass through the tube is decreased. Thus, by adjusting the relative compressions on the respective tubes, the quotient samples from the same initial sample may be delayed or advanced to arrive at their respective flow cells in the desired sequence.

The phaser 400 comprises a base 402, two capillary tubes 404, 406, which are fixed to the base, and a U-shaped capillary tube 408 which is moveable with respect to the base and whose ends are slidable within the tube 404, 406. The tubes 404, 406 are mounted in parallel on the base by two sets of clamp blocks 410, 412. The base 402 includes a channel shaped member having two side portions 402A, 402B and a central web portion 402C. An end portion 414 may be fixed to each end respectively of the base to secure the phaser to a larger assembly. Each of clamp sets 410, 412 includes a lower block 416 having two U-shaped grooves in its upper surface, an upper block 418 having two V-shaped grooves in its lower surface and a central bolt 420 which is threaded into a press on nut 422 on the underside of the channel.

The U-tube 408 has its reflexed end mounted in a slide block 422. The block 422 has two parallel, horizontal bores 424, 426, each of which receives a respective leg of the U-tube 408, and a vertical bore 428 which receives a stud 430. The stud 430 is formed integrally with a foot portion 432 of T-shaped cross-section. The lower narrower subportion of the foot slides within a slot 434 cut through the central web portion 402C. A plate 436 having raised dimples 438 is screwed as by screws 429 to the lower subportion of the foot below the web portion 402C to secure the foot within the slot for sliding therein. A pair of set screws 440 secure the block 422 to the stud 430. The U-tube 408 may be fixed to the block 422 by a suitable adhesive. A protective cover 442, in the form of a strip, is provided for the U-tube. One end of the strip has a hole 444 which fits onto the top of the stud 430, is spaced from the block by washers 446 and is screwed in place by a C-washer 448. The edges of the other end are guided within two slots 450 formed in each of the upper blocks 418.

Two seal assemblies 460, 462 are provided between the mating ends of the tubes 404 and 408, and 406 and 408 respectively. Each assembly includes an outer cup 462 having a large diameter bore portion 464 which receives the end of the tube 404 or 406 and is sealed thereto, as by adhesive; and a smaller diameter bore portion 466 which receives a resilient ring seal 468. The ring seal, which may be of a U-shaped cross-section, made of a fluorinated hydrocarbon plastic, with a helical spring core, provides a seal between the cup 462 and the leg of the tube 408.

Two inlet tubes 470, 472 as sealed to the ends of the tubes 404, 406 to provide suctions for the phaser into the system, in a manner similar to that shown in FIG. 11 for the phaser 330.

The sampling switch 324 comprises a rotary switch having a plurality of decks of contacts. The first contact deck 324A serves to couple in sequence the output signal of each of the flow cell assemblies which receives a quotient sample to one input 322A of the null-balancing bridge 322. The second contact deck 324B serves to couple in sequence the output signal of either a reference flow cell assembly photocell 196 or a reference flow cell assembly vacuum tube detector 198 to the other input 322B of the bridge. The third contact deck 324C serves to couple in sequence the output signal of the unknown photocells 376 of the spectrophotometer 312 to the input 322A of the bridge. The fourth contact deck 324D serves to couple in sequence the output signal of the reference photocells 378 of the spectrophotometer. The fifth contact deck 324E serves to illuminate in sequence each of the indicator lamps 76 to indicate which of the unknown flow cell assemblies is being coupled to the primary recorder 320. The sampling switch 324 makes one full cycle for each initial sample as provided by the sampler assembly 302. The sampler assembly 302 operates a timing cam 380 which actuates a micro-switch to move the sampling switch from its "home" position.

The monitoring switch 328 serves to couple the output signals from each of the unknown flow cells assemblies of the colorimeter and the unknown photocells 376 of the spectrophotometer to the monitoring recorder 326. The exemplary monitoring recorder is a multi-point recorder having a single stylus 326A with a traversing mechanism 326B which is sequentially and cyclically coupled to three input channels. The switch 328 comprises three cross-bars 328A, any of which can be coupled to any of the input channels 328B by contact pins 328C. The stylus intermittently prints the output curves from three sample channels, each being a substantially smooth curve, during the interval that the primary recorder 320 is not coupled to the respective sample channel. When the primary recorder is coupled to the respective sample channel it changes the impedance of the load on the respective photocell, changing the full scale voltage available to the monitoring recorder. Thus, the traversing mechanism of the monitoring recorder causes its stylus to shift or execute a step function in one direction when the primary recorder is switched onto this respective channel, and causes its stylus to execute a step function in the reverse direction when the primary recorder is switched out of this respective channel. By this double step function, the phasing of the primary recorder sampling interval with respect to the peak or plateau of the optical density of the liquid sample in the respective channel is instantly apparent to the operator, and a permanent record thereof is also automatically created. If the phasing should be changed, the operator need merely vary the respective phaser 330. Obviously, any chart type recorder with one or more stylii may be utilized as the monitoring recorder.

A monitoring meter, not shown, may be substituted for the monitoring recorder 326. In such a case, the operator would have to observe the peak value indicated by the meter and ensure that this peak occurred during the readout of the flow cell to the recorder 320.

Subject matter including the phasing monitoring recorder disclosed in this application is claimed in the application of Milton H. Pelavin, Ser. No. 529,492, filed Feb. 28, 1966, and assigned to a common assignee.

Subject matter including the colorimeter disclosed in this application is claimed in the application of Jack Isreeli and Richard H. Heimann, Ser. No. 529,466, filed Feb. 23, 1966, and assigned to a common assignee.

While there have been shown and described preferred embodiments of this invention, it will be understood that the invention may be embodied otherwise than as herein specifically illustrated and described, and that changes in the form and the arrangement of the parts and in the specific manner of practicing the invention may be made without departing from the underlying principles of this invention within the scope of the appended claims.

What is claimed is:

1. Apparatus for the analysis of sample liquids comprising a source of a steam of sample liquid; means for analyzing said sample liquid; and a conduit means, having a volume which is adjustably continuously variable between a maximum and a minimum, intercoupling said source to said analysis means, said conduit means including a plurality of mutually telescoping tubes for varying said volume.

2. Apparatus according to claim 1 wherein: said plurality of tubes comprises a first and second parallel spaced apart tube; a third, U-shaped tube having one end thereof slidably disposed within one end of said first tube and the other end thereof slidably disposed within one end of said second tube.

3. Apparatus according to claim 1 wherein: said plurality of tubes comprises a first and a second spaced apart tube; and a third tube adapted to be inserted in and sildably disposed in each of said first and second tubes for varying said volume.

4. Automatic analysis apparatus, comprising: a multiple channel colorimeter including a central light source, a plurality of light focusing means disposed around said source, a companion plurality of light detecting means, each for receiving a light beam from a respective companion light focusing means and for providing a signal responsive to the intensity of the light detected, and a plurality of flow cell means, each interposed between a companion set of light focusing means and light detecting means; source means for supplying a series of separate and discrete liquid samples for the treatment of each sample for quantitative analysis in respect to each of a plurality of known constituents thereof; means for effecting said treatment of each sample; a plurality of conduit means coupled to said treatment effecting means and each respectively coupled to a companion flow cell for transmitting to its companion flow cell a flowing stream of treated liquid for colorimetric analysis in said companion flow cell; said source means including a plurality of containers each for containing a sample liquid, off-take means for sequentially off-taking sample liquid from each of said containers and for transmitting such liquid as a flowing initial stream of liquid samples; said treatment effecting means including dividing means coupled to said off-take means for receiving the initial stream, for dividing the initial stream into a plurality of quotient streams, each quotient stream being a flowing stream of liquid segments, each segment being a fractional portion of a respective sample from said initial stream, and for treating the streams for analysis; said plurality of conduit means being coupled to said treatment effecting means for receiving the plurality of treated quotient streams respectively therefrom; and at least one of said conduit means includes a tube, assembly, through which the respective quotient stream flows, formed of a plurality of mutually telescoping tubes.

5. Automatic analysis apparatus according to claim 4 wherein: at least each of said plurality except one of said conduit means includes a respective tube assembly.

6. Automatic analysis apparatus according to claim 5, further comprising: a recorder, including a stylus, and means for traversing said stylus responsive to a signal; and switch means for cyclically, sequentially and intermittently coupling the signal from each of said light detecting means to said stylus traversing mechanism, the period of each cycle of said switch means being equal to the period of said off-take means required to off-take a sample from one said container; each of said tube assemblies being adapted to adjustably change the running time of the respective quotient stream from said off-take means to the respective flow cell.

7. Automatic analysis apparatus according to claim 6, wherein: each of said treated liquid segments of said quotient stream has at least a subportion thereof whose optical density is responsive to a predetermined constituent therein, and said tube assemblies are effective to phase the arrival of the respective subportions from the same initial sample at their respective flow cells concurrently with the coupling of the signal from the respective light detecting means to said stylus traversing means.

References Cited
UNITED STATES PATENTS

| | | | |
|---|---|---|---|
| 2,797,149 | 6/1957 | Skeggs | 23—230 |
| 3,316,935 | 5/1967 | Kaiser | 251—4 XR |

MORRIS O. WOLK, Primary Examiner

R. E. SERWIN, Assistant Examiner

U.S. Cl. X.R.

23—230, 259; 138—42, 43, 46; 222—529, 564; 251—4